United States Patent [19]
Takao et al.

[11] Patent Number: 5,733,501
[45] Date of Patent: Mar. 31, 1998

[54] LEAD-FREE SOLDER ALLOY

[75] Inventors: Hisaaki Takao; Hideo Hasegawa; Shinichi Towata, all of Nagoya, Japan

[73] Assignee: Kabushiki Kaisha Toyota Chuo Kenkyusho, Aichi-ken, Japan

[21] Appl. No.: 675,825

[22] Filed: Jul. 5, 1996

[30] Foreign Application Priority Data

Jul. 4, 1995 [JP] Japan ................... 7-168971
Jun. 21, 1996 [JP] Japan ................... 8-162182

[51] Int. Cl.$^6$ ................... B23K 35/26; C22C 13/00
[52] U.S. Cl. ................... 420/562; 420/557
[58] Field of Search ................... 420/562, 557

[56] References Cited

U.S. PATENT DOCUMENTS

| | | | |
|---|---|---|---|
| 5,328,660 | 7/1994 | Gonya et al. | 4200/562 |
| 5,429,689 | 7/1995 | Shangguan et al. | 148/400 |
| 5,435,857 | 7/1995 | Han et al. | 148/24 |
| 5,520,752 | 5/1996 | Lucey, Jr. et al. | 148/400 |

FOREIGN PATENT DOCUMENTS

| | | |
|---|---|---|
| 710521 | 5/1996 | European Pat. Off. . |
| 6-15476 | 1/1994 | Japan . |
| 6-238479 | 8/1994 | Japan . |
| 6-344180 | 12/1994 | Japan . |
| 7-88681 | 4/1995 | Japan . |

*Primary Examiner*—Sikyin Ip
*Attorney, Agent, or Firm*—Oblon, Spivak, McClelland, Maier & Neustadt, P.C.

[57] ABSTRACT

A lead-free solder alloy comprises 0.8 to 5.0% inclusive by weight of Ag, not less than 0.1% by weight of In, not less than 0.1% by weight of Bi, the total amount of In and Bi being not more than 17% by weight and the balance of Sn and inevitable impurities. The other lead-free solder alloy further contains 0.1 to 10% by weight of Sb. These solder alloys have low melting point and narrow melting range, and furthermore, they show excellent wettability and mechanical characteristics.

3 Claims, 8 Drawing Sheets

LEAD-FREE SOLDER ALLOY

BACKGROUND OF THE INVENTION

1. Field of the Invention

The present invention relates to a lead-free solder alloy.

2. Description of the Related Arts

Electronic parts are mostly connected with a solder generally comprising a Pb—Sn alloy. However, because lead is a toxic metal regardless of its usefulness, it is recently noticed as an environmental problem that lead eluted from disposed electric products pollutes the ground water. In the United States, for example, there is a tendency to regulate the use of lead in solder.

A Sn—Ag alloy, a Sn—Sb alloy and a Sn—Bi alloy are respectively defined as a lead-free solder alloy in Z 3282 of JIS or Japanese Industrial Standard. The Sn—Ag alloy and the Sn—Sb alloy are respectively used as a solder alloy having high melting point. On the other hand, the Sn—Bi alloy is used as a solder alloy having low melting point.

However, these lead-free solder alloys have the following disadvantages as compared with an alloy comprising 63% by weight of Sn and 37% by weight of Pb which is conventionally and widely used ("% by weight" is merely described as "%" hereinafter). The Sn—Ag alloy and the Sn—Sb alloy have higher melting point, and the Sn—Bi alloy has lower melting point, which are problems in themselves. Furthermore, these solder alloys show poor wettability for a material to be soldered. Therefore, a lead-free solder alloy has to be improved in some practical points to take over the Pb—Sn alloy.

In order to lower the melting point of conventional lead-free solder alloys, Japanese Unexamined Patent Publication No. 15476/1994 discloses a solder alloy comprising an effective amount of Sn, Ag and In. The solder alloy shows a solidus temperature in the range of approximately 167° C. to 212° C., and a liquidus temperature in the range of approximately 179° C. to 213° C.

Japanese Unexamined Patent Publication No. 238479/1994 discloses two kinds of lead-free solder alloys. One solder alloy comprises Zn in an amount of from not less than 0.2% to not more than 6.0%, Ag in an amount of from not less than 1.0% to not more than 6.0% and the balance of Sn, and the other solder alloy comprises Zn in an amount of from not less than 0.2% to not more than 6.0%, Ag in an amount of from not less than 1.0% to not more than 6.0%, In in an amount of from not less than 0.2% to not more than 6.0%, Bi in an amount of from not less than 0.2% to not more than 6.0% and the balance of Sn. (Such expression as "A in an amount of from not less than B% to not mope than C%" is merely described as "B to C% of A" hereinafter.) The purpose of these solder alloys is to improve mechanical strength and creep resistance while maintaining excellent characteristics of the Sn—Ag alloy. This invention also discloses that Bi or In shows an effect of lowering the melting point.

Japanese Unexamined Patent Publication No. 88681/1995 discloses a multicomponent solder alloy comprising a Sn alloy containing 2.0% of Ag, 9.8% of Bi and 9.8% of In. The solder alloy shows high solidus temperature and high mechanical strength. U.S. Pat. No. 5,429,689 discloses a solder alloy comprising 80% of Sn, 5.0 to 14.5% of In, 4.5 to 14.5% of Bi and 0.5% of Ag. The solder alloy has a stable microstructure and good fatigue resistance. Furthermore, U.S. Pat. No. 5,435,857 discloses a solder alloy comprising In, Sb, Ag and not more than 10.0% of Bi.

As disclosed in Japanese Unexamined Patent Publication No. 15476/1994, the melting point and the melting range (the range between the solidus temperature and the liquidus temperature) are two major points in using the solder alloy. The alloy begins to melt at the solidus temperature (melting point), but it doesn't change to liquid completely until the temperature reaches higher temperature (liquidus temperature). The melting range is called as a pasty range ($\Delta T$).

A solder alloy which is generally used for electronic parts has preferably low melting point and narrow melting range.

The wettability is also an important characteristic. In soldering, a melted solder is poured into a jointing portion between the metals of the electronic parts to joint them. In order to obtain electrically and mechanically excellent jointing portion, solder is required to have excellent wettability to a material to be jointed. In producing electronic parts, several hundred jointing portions are simultaneously connected by soldering in a few seconds. Even if only one jointing portion cannot be connected properly due to poor wettability of solder, an entire circuit results to be defective. So, the wettability is an important characteristic of the solder alloy.

The mechanical characteristic is also an important characteristic. Recently, the solder in electronic parts is required to adapt itself to severer condition than before, because electronic parts are reducing in their size and highly integrated, and they are applied to a wide range, i.e. space (communication satellite), automobiles and so on. Electronic parts or printed circuit boards are subjected to a thermal expansion or a thermal shrinkage caused by heating of electronic parts or a temperature change of working environment. This makes a stress or a strain at the jointing portion. Such thermal fatigue makes, if a jointing strength of solder is weak, a crack at solder itself, and peeling on the soldering portion. Even if only one portion is peeled, an electrical conductivity is interrupted. As a result, the function as an electronics cannot be performed. Therefore, the solder alloy having excellent mechanical characteristics is required for increasing reliability in soldering.

Furthermore, the cost is also taken into much consideration when using the solder alloy. In view of production engineering, when a conventional Sn—Pb solder alloy is shifted to a lead-free solder alloy, an increase in cost should be controlled to a minimum. For cost confinement, it is necessary to control the increase of raw material cost followed with a composition change of an alloy. It is also necessary to control the increase an equipment cost by adopting the conventional jointing process.

As for the composition of the alloy disclosed in Japanese Unexamined Patent Publication No. 15476/1994, the alloy comprising 71.5% of Sn, 2.6% of Ag and 25.6% of In shows the lowest solidus temperature of 167.8° C. and the melting range of 11.3° C. However, the alloy contains no less than 25.6% of In. The cost of Paw material of In is very expensive, namely, 40,000 yen/kg (market price in March, 1995). According to an estimate calculation of raw materials of the alloy, the cost is 23 times as much as that of a conventional alloy comprising 63% of Sn and 37% of Pb. So, an increase in cost is unavoidable. Furthermore, wettability of the alloy is not disclosed at all.

As for the composition of the alloy disclosed in Japanese Unexamined Patent Publication No. 23479/1994, the alloy comprising 87.5% of Sn, 3.5% of Ag, 1.0% of Zn, 4.0% of Bi and 4.0% of In shows the lowest melting point of 197.0° C. The alloy comprising other composition shows higher melting temperature than 197.0° C. Further, the melting range of the alloy is not disclosed at all. Since the alloy contains Zn which is likely to be oxidized, the soldering process should be operated in a nitrogen atmosphere. This results in that the present soldering process is not available and new equipments are required for the process with cost increase. Furthermore, wettability of the alloy is not disclosed at all.

SUMMARY OF THE INVENTION

In view of the above disadvantages, it is an object of the present invention to provide a lead-free solder alloy which lowers the melting point of the Sn—Ag alloy, and narrows the melting range. Furthermore, the solder alloy of the present invention controls an increase in cost, and shows excellent wettability and mechanical characteristics.

Inventors found out the following matters and completed the present invention. In and Bi are added to a Sn—Ag alloy, and Sb is further added to the Sn—Ag alloy. As a result, it is possible to lower the melting point of a Sn—Ag alloy, to improve the wettability and to obtain excellent mechanical characteristics. Furthermore, it is possible to control an increase in cost.

The first solder alloy of the present invention comprises 0.8 to 5.0% of Ag, not less than 0.1% of In, not less than 0.1% of Bi, the total amount of In and Bi being not more than 17% and the balance of Sn and inevitable impurities.

Preferably, the first solder alloy contains 0.8 to 4.0% of Ag, not more than 14% of In and not more than 14% of Bi. More preferably, the first solder alloy contains 0.8 to 3.5% of Ag, 1.0 to 9.5% of In and 1.0 to 9.5% of Bi. Most preferably, the first solder alloy contains 1.5 to 3.3% of Ag.

The second solder alloy of the present invention comprises 0.8 to 5.0% of Ag, 0.1 to 9.5% of In, 0.1 to 9.5% of Bi, the total amount of In and Bi being not more than 17%, 0.1 to 10% of Sb and the balance of Sn and inevitable impurities.

Preferably, the second solder alloy contains 0.8 to 3.5% of Ag, 1.0 to 9.5% of In and 1.0 to 9.5% of Bi. More preferably, the second solder alloy contains 0.5 to 6.0% of Sb.

The solder alloy of the present invention can be easily prepared on the basis of prior arts. For example, Sn, Ag, In, Bi and Sb are scaled and put into a heated vessel. In this case, an alloy can be partially used. Such metals can be melted by any conventional molten techniques. These metals are heated until they completely change to liquid. After that, the liquid is poured into an appropriate mold, and it is cooled. Materials for soldering can be shaped by an appropriate method into bar, ribbon, wire, powder and so on, depending on a purpose. It is also possible to form a ribbon or a powder by using a quenching method.

In the solder alloy of the present invention, not only In but also Bi is added to a Sn—Ag alloy. So, it is possible to lower the melting point to the same level as that achieved by adding only In. In case only In is added, an increase in an amount of In deteriorates a creep characteristic. In case only Bi is added, an increase in an amount of Bi deteriorates deformability. However, when both In and Bi are added, it is possible to obtain a solder alloy having excellent deformability and creep resistance. Furthermore, it is possible to control an increase in cost.

In case only In is added to a Sn—Ag alloy, it is impossible to improve the wettability. However, when Bi is further added, it is possible to obtain a solder alloy having excellent wettability.

When Sb is further added to the solder alloy, it is possible to provide a lead-free solder alloy which lowers the melting point, and narrows the melting range. Furthermore, the solder alloy shows an excellent mechanical strength.

A conventional solder alloy comprising 96.5% of Sn and 3.5% of Ag shows a eutectic temperature of 221° C. and the wettability of 75%. Since the solder alloy is an eutectic alloy, it has no melting range. As disclosed in Japanese Unexamined Patent Publication No. 15476/1994, a solder alloy comprising 87.7% of Sn, 3.2% of Ag and 9.1% of In shows a solidus temperature of 201° C., a melting range of 20° and the wettability of 75%. As compared with the above conventional solder alloy, the solidus temperature can be surely lowered, but the wettability cannot be improved. Furthermore, the cost of raw materials is 10 times as much as that of a conventional alloy comprising 63% of Sn and 37% of Pb. On the contrary, the present invention discloses a solder alloy comprising 87.7% of Sn, 3.2% of Ag, 1.8% of In and 7.3% of Bi which shows a solidus temperature of 198° C., a melting range of 9° C. and the wettability of 78%. An amount of In of the conventional solder alloy is the same as the total amount of In and Bi. Though, in the solder alloy of the present invention, it is possible to lower the solidus temperature, to improve the wettability and to control an increase in cost of raw materials.

It is generally known that both a solidus temperature and a liquidus temperature increase as an amount of Sb increases in an Sn—Sb alloy. A melting temperature cannot be lowered by adding Sb to Sn. However, in the present invention, not only Sb but also In and Bi are added. So, it is possible to lower a solidus temperature, and to narrow a melting range. The present invention discloses a solder alloy comprising 86.9% of Sn, 3.2% of Ag, 5.9% of In, 3.1% of Bi and 0.9% of Sb which is obtained by adding Sb to a solder alloy comprising 87.7% of Sn, 3.2% of Ag, 6.0% of In and 3.1% of Bi. The solder alloy containing Sb shows a solidus temperature of 196° C. and a melting range of 0° C. Namely, the solidus temperature is 5° C. lower, and the melting range is 10° C. narrower, as compared with the solder alloy containing no Sb.

Generally, a solder alloy in which a micro particle is uniformly dispersed in a matrix shows an excellent mechanical characteristic. However, when a solder alloy contains less than 0.8% of Ag, the wettability is not improved, and only a small amount of Ag—Sn intermetallic compound particles is dispersed in the solder alloy. So, it is impossible to maintain an excellent characteristic. On the contrary, when the solder alloy contains more than 5% of Ag, a melting range widens, and the wettability deteriorates.

When a solder alloy contains less than 0.1% of In, an effect of lowering a melting point cannot be satisfactorily obtained. The same matter applies to the case of Bi. When a solder alloy contains more than 17% of the total amount of In and Bi, a melting range widens. As for a solder alloy further containing Sb, when the solder alloy contains more than 17% of the total amount of In and Bi, a melting range widens.

When a solder alloy contains less than 0.1% of Sb, an effect of improving a mechanical characteristic cannot be satisfactorily obtained. On the contrary, when a solder alloy contains more than 10% of Sb, a melting range widens.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
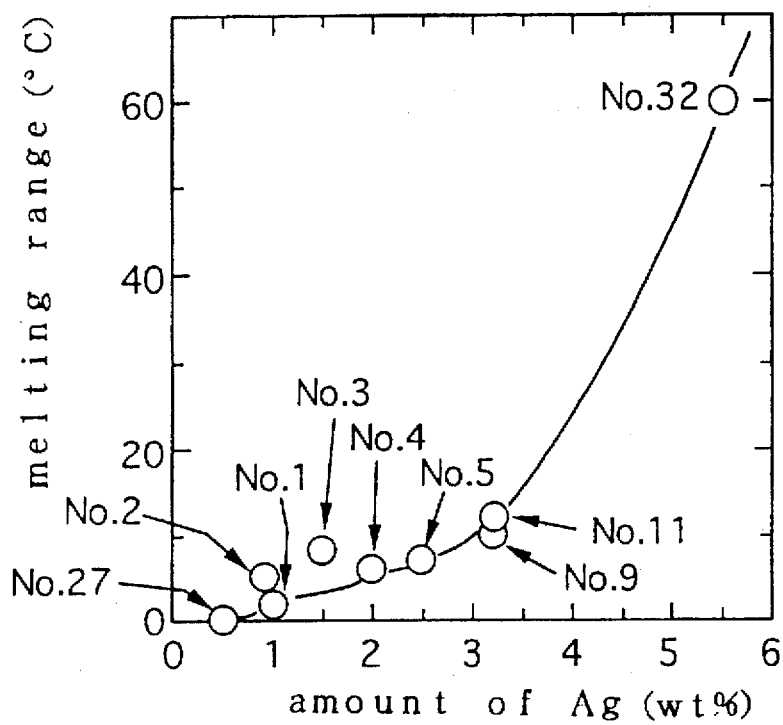
FIG. 1 is a diagram for showing the relationship between the amount of Ag and the melting range (ΔT) as for some solder alloys: sample Nos. 1 to 5, 9 and 11 in the preferred embodiments, and sample Nos. 27 and 32 in the comparative examples.

Having generally described the present invention, a further understanding can be obtained by reference to the specific preferred embodiments which are provided herein for purposes of illustration only and are not intended to limit the scope of the appended claims.

The Preferred Embodiment employed Sn, Ag, In, Bi and Sb having the purity of not less than 99.9% to obtain Sn—Ag—In—Bi based lead-free solder alloys (sample Nos. 1 to 16) and Sn—Ag—In—Bi—Sb based lead-free solder alloys (sample Nos. 17 to 26). Each composition of these alloys is shown in Table 1. Furthermore, lead-free solder alloys (sample Nos. 27 to 36) are prepared as the comparative examples. Each composition of these alloys is shown in Table 2. As for each solder alloy, a solidus temperature, a liquidus temperature, a melting range (pasty range ΔT) and wettability are measured. The result is shown in Table 1.

A solder alloy comprising Sn—Ag—In—Bi in the preferred embodiments shows lower solidus temperature in the range of 174° to 210° C. Furthermore, as for the solder alloy in the preferred embodiments, a melting range is narrower, and the wettability is approximately 3% larger as compared with a solder alloy in the comparative examples. A solidus temperature and a liquidus temperature are measured by thermal analysis at the time of heating and cooling temperature. The wettability is measured by a method which is regulated by JIS Z 3197.

TABLE 1

| No. | composition of alloys (% by weight) | melting temperature (°C.) solidus temp. | liquidus temp. | melting range | wettability |
|---|---|---|---|---|---|
| 1 | Sn—0.9Ag—1.9In—4.7Bi | 197–199 | | 2 | 76 |
| 2 | Sn—1.0Ag—2.0In—5.0Bi | 194–199 | | 6 | 76 |
| 3 | Sn—1.5Ag—2.0In—5.0Bi | 193–200 | | 8 | 77 |
| 4 | Sn—2.0Ag—2.0In—5.0Bi | 193–199 | | 6 | 77 |
| 5 | Sn—2.5Ag—4.5In—5.0Bi | 192–199 | | 7 | 78 |
| 6 | Sn—3.3Ag—3.1In—1.6Bi | 205–220 | | 15 | 76 |
| 7 | Sn—3.3Ag—1.6In—3.1Bi | 210–211 | | 1 | 78 |
| 8 | Sn—3.2Ag—7.3In—1.8Bi | 200–214 | | 14 | 76 |
| 9 | Sn—3.2Ag—6.0In—3.1Bi | 201–211 | | 10 | 78 |
| 10 | Sn—3.2Ag—4.5In—4.5Bi | 190–210 | | 20 | 76 |
| 11 | Sn—3.2Ag—3.1In—6.0Bi | 198–210 | | 12 | 78 |
| 12 | Sn—3.2Ag—1.8In—7.3Bi | 198–207 | | 9 | 78 |
| 13 | Sn—2.9Ag—13.3In—3.3Bi | 174–192 | | 18 | 76 |
| 14 | Sn—2.9Ag—11.0In—5.7Bi | 181–187 | | 6 | 78 |
| 15 | Sn—2.9Ag—5.7In—11.0Bi | 180–202 | | 22 | 77 |
| 16 | Sn—2.9Ag—3.3In—13.3Bi | 180–199 | | 19 | 78 |
| 17 | Sn—3.2Ag—6.8In—2.3Bi—0.9Sb | 194–215 | | 21 | 75 |
| 18 | Sn—3.2Ag—5.9In—3.1Bi—0.9Sb | 196 | | 0 | 76 |
| 19 | Sn—3.2Ag—5.0In—4.1Bi—0.9Sb | 193–207 | | 14 | 75 |
| 20 | Sn—3.2Ag—4.5In—4.5Bi—0.9Sb | 199–217 | | 18 | 76 |
| 21 | Sn—3.2Ag—4.1In—5.0Bi—0.9Sb | 199–210 | | 11 | 76 |
| 22 | Sn—3.2Ag—3.1In—5.9Bi—0.9Sb | 199–217 | | 18 | 77 |
| 23 | Sn—3.2Ag—2.3In—6.8Bi—0.9Sb | 199–207 | | 8 | 77 |
| 24 | Sn—3.1Ag—5.8In—3.0Bi—2.7Sb | 194–200 | | 6 | 74 |

TABLE 1-continued

| | | melting temperature (°C.) | | | |
|---|---|---|---|---|---|
| No. | composition of alloys (% by weight) | solidus temp. | liquidus temp. | melting range | wettability |
| 25 | Sn—3.1Ag—3.0In—5.8Bi—2.7Sb | 201–208 | | 7 | 75 |
| 26 | Sn—3.0Ag—5.7In—2.9Bi—5.2Sb | 202–219 | | 17 | 74 |

TABLE 2

| | | melting temperature (°C.) | | | |
|---|---|---|---|---|---|
| No. | composition of alloys (% by weight) | solidus temp. | liquidus temp. | melting range | wettability |
| 27 | Sn—0.5Ag—6.0In—3.1Bi | 193 | | 0 | 75 |
| 28 | Sn—2.7Ag—18.5In—4.6Bi | 168–201 | | 33 | 75 |
| 29 | Sn—2.7Ag—4.6In—18.5Bi | 163–194 | | 31 | 78 |
| 30 | Sn—2.4Ag—29.5In—1.6Bi | 107–156 | | 49 | 62 |
| 31 | Sn—2.4Ag—1.6In—29.5Bi | 131–214 | | 83 | 75 |
| 32 | Sn—5.5Ag—6.0In—13.1Bi | 198–257 | | 59 | 75 |
| 33 | Sn—3.5Ag | 221 | | 0 | 75 |
| 34 | Sn—3.3Ag—4.8In | 211–228 | | 17 | 74 |
| 35 | Sn—3.2Ag—9.1In | 201–221 | | 20 | 75 |
| 36 | Sn—3.5Ag—1.0Zn | 218 | | 0 | 68 |

A solder alloy containing Sb (sample No. 18) shows lower solidus temperature of 196° C. as compared with a solder alloy containing no Sb (sample No. 9) which shows a solidus temperature in the range of 201° to 211° C. Namely, the solidus temperature of the sample No. 18 is approximately 5° C. lower than that of the sample No. 9. Furthermore, the cost of sample No. 12 in the preferred embodiments is two fifths of that of sample No. 35 of the comparative examples.

The characteristics of the solder alloys according to the present invention will be hereinafter described with reference to FIGS. 1 through 12.

FIG. 1 shows the relationship between an amount of Ag and a melting range as for some solder alloys in which the total amount of In and Bi is in the range of 6.6 to 9.5% (sample Nos. 1 to 5, 9 and 11 in the preferred embodiments, and sample Nos. 27 and 32 in the comparative examples). In FIG. 1, a horizontal axis represents the amount of Ag, and a vertical axis represents the melting range. According to FIG. 1, as the amount of Ag increases, the melting range widens.

Figure 2:
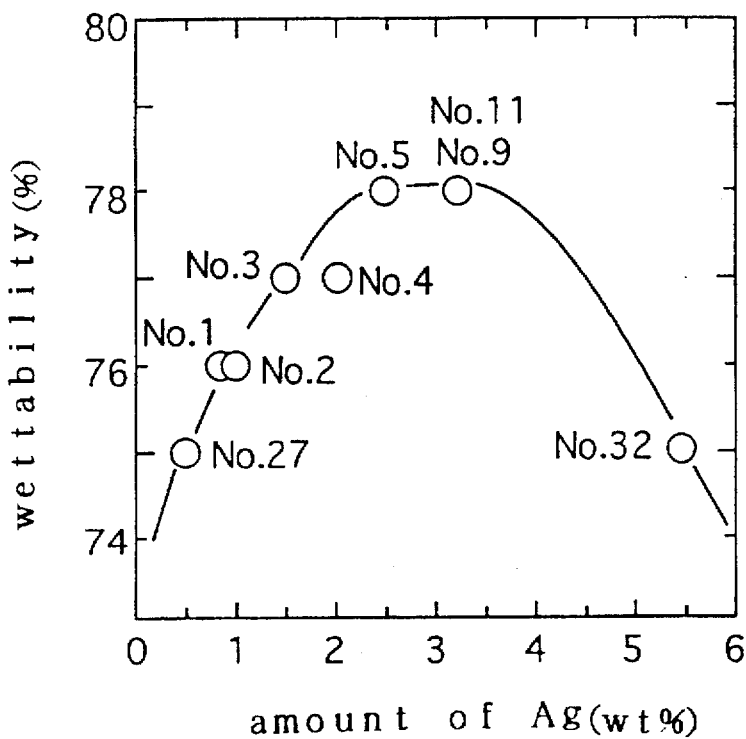
FIG. 2 is a diagram for showing the relationship between the amount of Ag and the wettability as for the same solder alloys as those in FIG. 1.

FIG. 2 shows the relationship between an amount of Ag and the wettability as for the same solder alloys as those in FIG. 1. In FIG. 2, a horizontal axis represents the amount of Ag, and a vertical axis represents the wettability. According to FIG. 2, when the amount of Ag is approximately the wettability shows the maximum.

As seen from FIGS. 1 and 2, in order to obtain narrow melting range and excellent wettability, the amount of Ag is preferably in the range of 0.8 to 5.0%, more preferably, in the range of 0.8 to 4.0%, most preferably, in the range of 0.8 to 3.5%.

Figure 3:
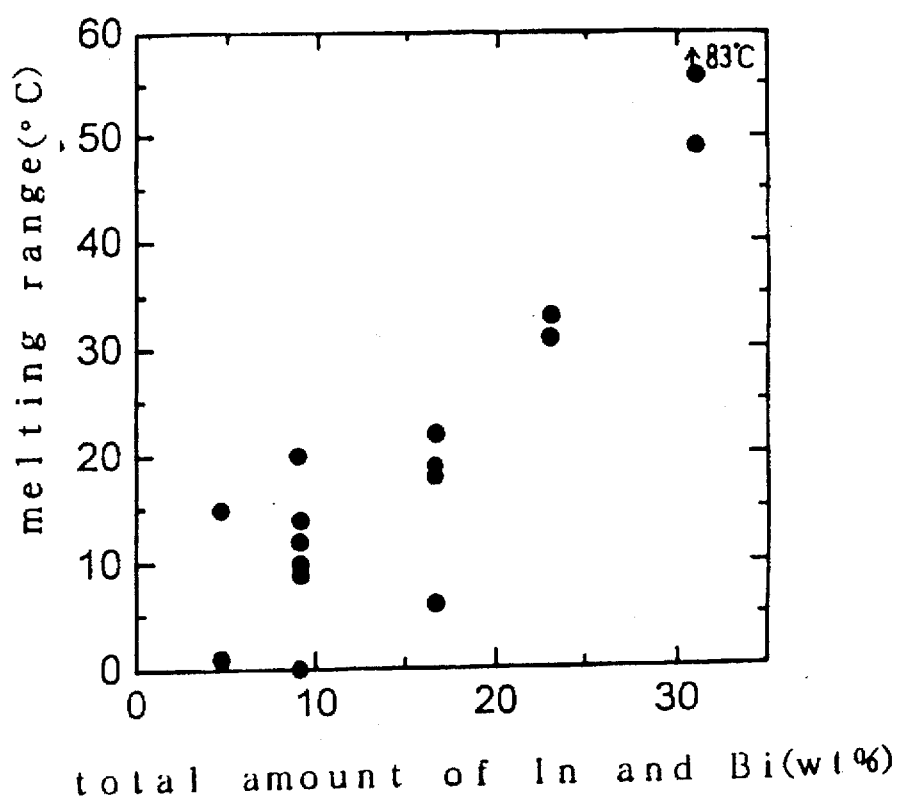
FIG. 3 is a diagram for showing the relationship between the total amount of In and Bi and the melting range (ΔT) as for all solder alloys in the preferred embodiments and the comparative examples as shown in Tables 1 and 2.

FIG. 3 shows the relationship between the total amount of In and Bi and a melting range as for all solder alloys in the preferred embodiments and the comparative examples as shown in Tables 1 and 2. In FIG. 3, a horizontal axis represents the total amount of In and Bi, and a vertical axis represents the melting range. According to FIG. 3, as the total amount of In and Bi increases, the melting range widens.

As seen from FIG. 3, the total amount of In and Bi is preferably not more than 17%.

Figure 4:
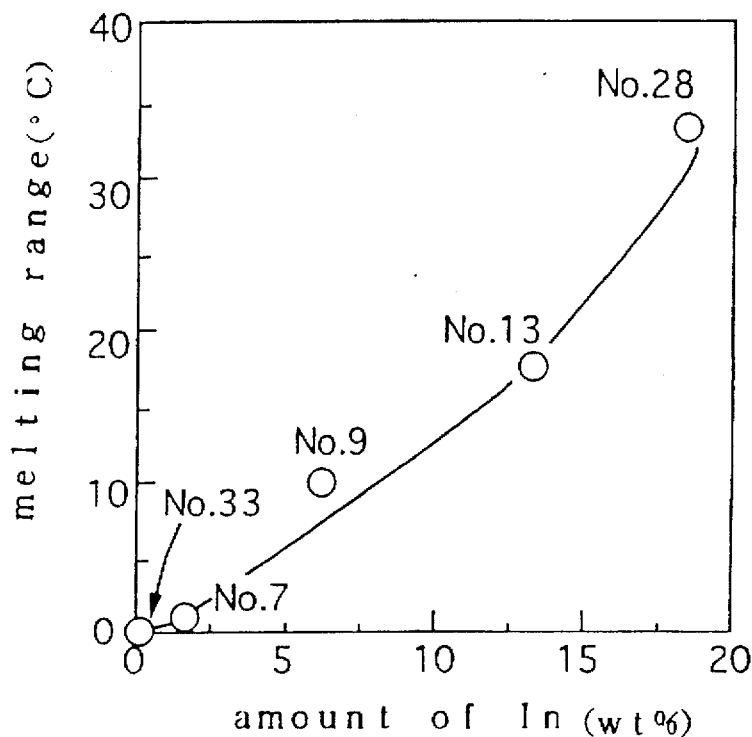
FIG. 4 is a diagram for showing the relationship between the amount of In and the melting range (ΔT) as for some solder alloys: sample Nos. 7, 9 and 13 in the preferred embodiments, and sample Nos. 28 and 33 in the comparative examples.

FIG. 4 shows the relationship between an amount of In and a melting range as for some solder alloys (sample Nos. 7, 9 and 13 containing 3 to 4% of Bi in the preferred embodiments, and sample Nos. 28 and 33 in the comparative examples). In FIG. 4, a horizontal axis represents the amount of In, and a vertical axis represents the melting range. According to FIG. 4, as the amount of In increases, the melting range widens.

Figure 5:
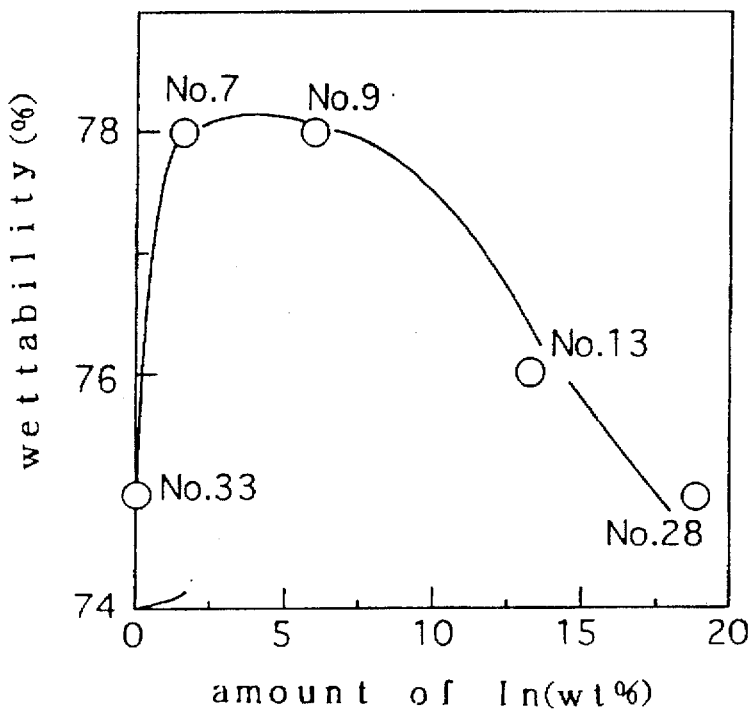
FIG. 5 is a diagram for showing the relationship between the amount of In and the wettability as for the same solder alloys as those in FIG. 4.

FIG. 5 shows the relationship between an amount of In and the wettability as for the same solder alloys as those in FIG. 4. In FIG. 5, a horizontal axis represents the amount of In, and a vertical axis represents the wettability. According to FIG. 5, when the amount of In is in the range of approximately 0.1 to 9.5%, the wettability shows the maximum. After the amount of In exceeds 9.5%, as the amount increases, the wettability deteriorates.

In order to obtain narrow melting range and excellent wettability, the amount of In is preferably in the range of 0.1 to 14%, more preferably, in the range of 1.0 to 9.5%.

Figure 6:
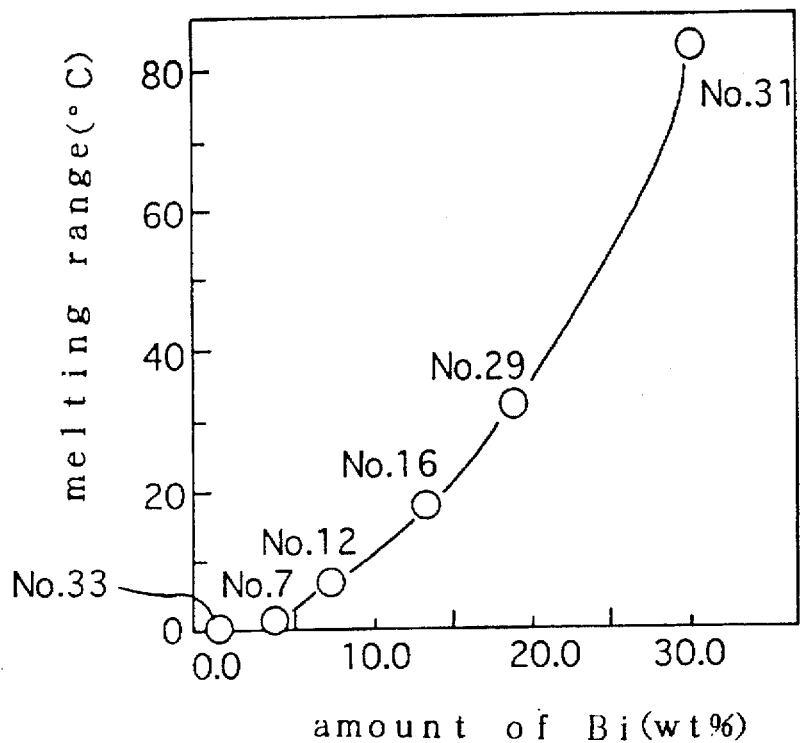
FIG. 6 is a diagram for showing the relationship between the amount of Bi and the melting range (ΔT) as for some solder alloys: sample Nos. 7, 12 and 16 in the preferred embodiments, and sample Nos. 29, 31 and 33 in the comparative examples.

FIG. 6 shows the relationship between an amount of Bi and a melting range as for some solder alloys (sample Nos. 7, 12 and 16 containing 1.6 to 4.6% of In in the preferred embodiments, and sample Nos. 29, 31 and 33 in the comparative examples). In FIG. 6, a horizontal axis represents the amount of Bi, and a vertical axis represents the melting range. According to FIG. 6, as the amount of Bi increases, the melting range widens. In order that the melting range is not more than 20° C., the amount of Bi is preferably not more than 14%, more preferably, not more than 9.5%.

Figure 7:
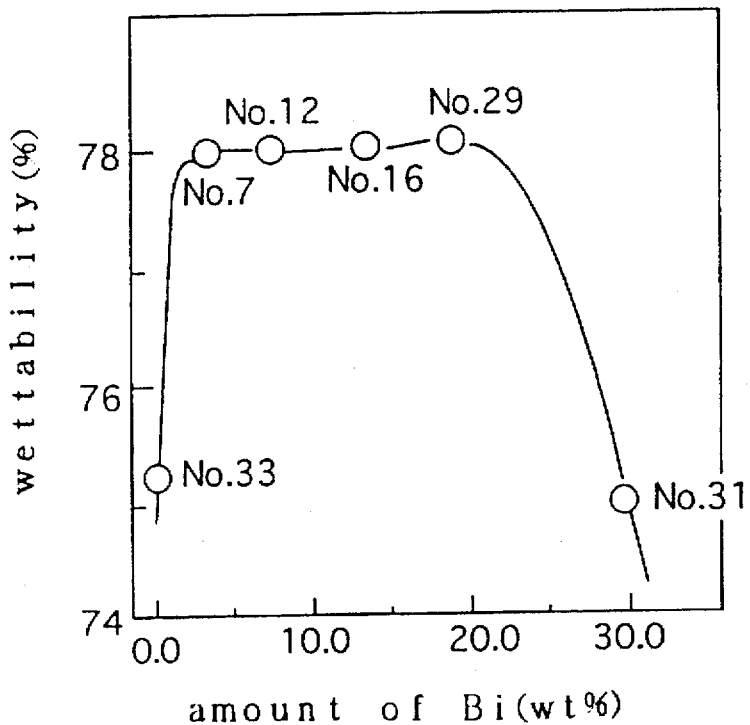
FIG. 7 is a diagram for showing the relationship between the amount of Bi and the wettability as for the same solder alloys as those in FIG. 6.

FIG. 7 shows the relationship between an amount of Bi and the wettability as for the same solder alloys as those in FIG. 6. In FIG. 7, a horizontal axis represents the amount of Bi, and a vertical axis represents the wettability. According to FIG. 7, when the amount of Bi is not less than 20%, the wettability deteriorates.

In order to obtain narrow melting range and excellent wettability, the amount of Bi is preferably in the range of 0.1 to 14%, more preferably, in the range of 1.0 to 9.5%.

As seen from FIGS. 3 to 7, in order to obtain narrow melting range and excellent wettability, each amount of In and Bi is in the range of 0.1 to 14% at maximum, preferably, in the range of 1.0 to 9.5%.

Figure 8:
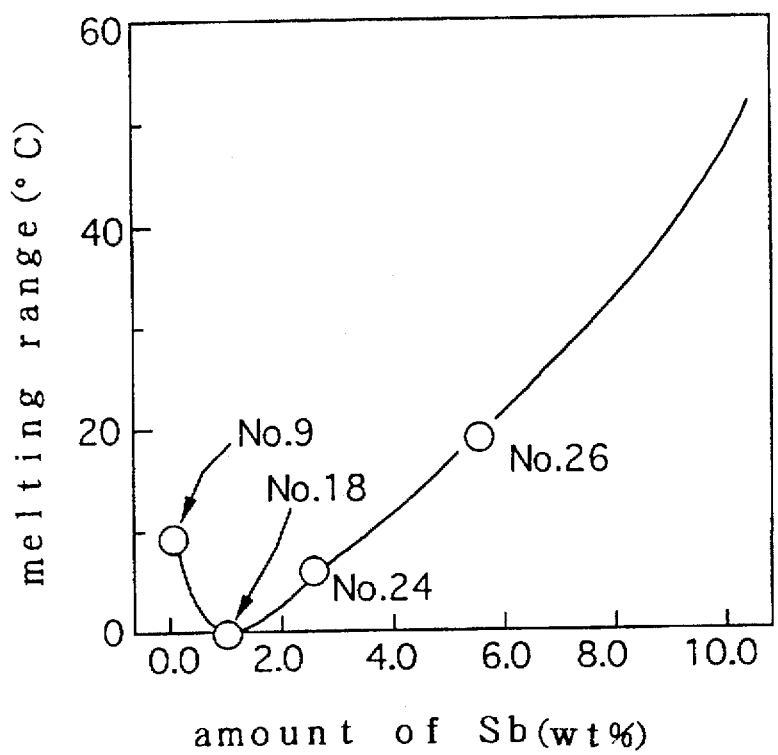
FIG. 8 is a diagram for showing the relationship between the amount of Sb and the melting range (ΔT) as for some solder alloys: sample Nos. 9, 18, 24 and 26 in the preferred embodiments.
Figure 9:
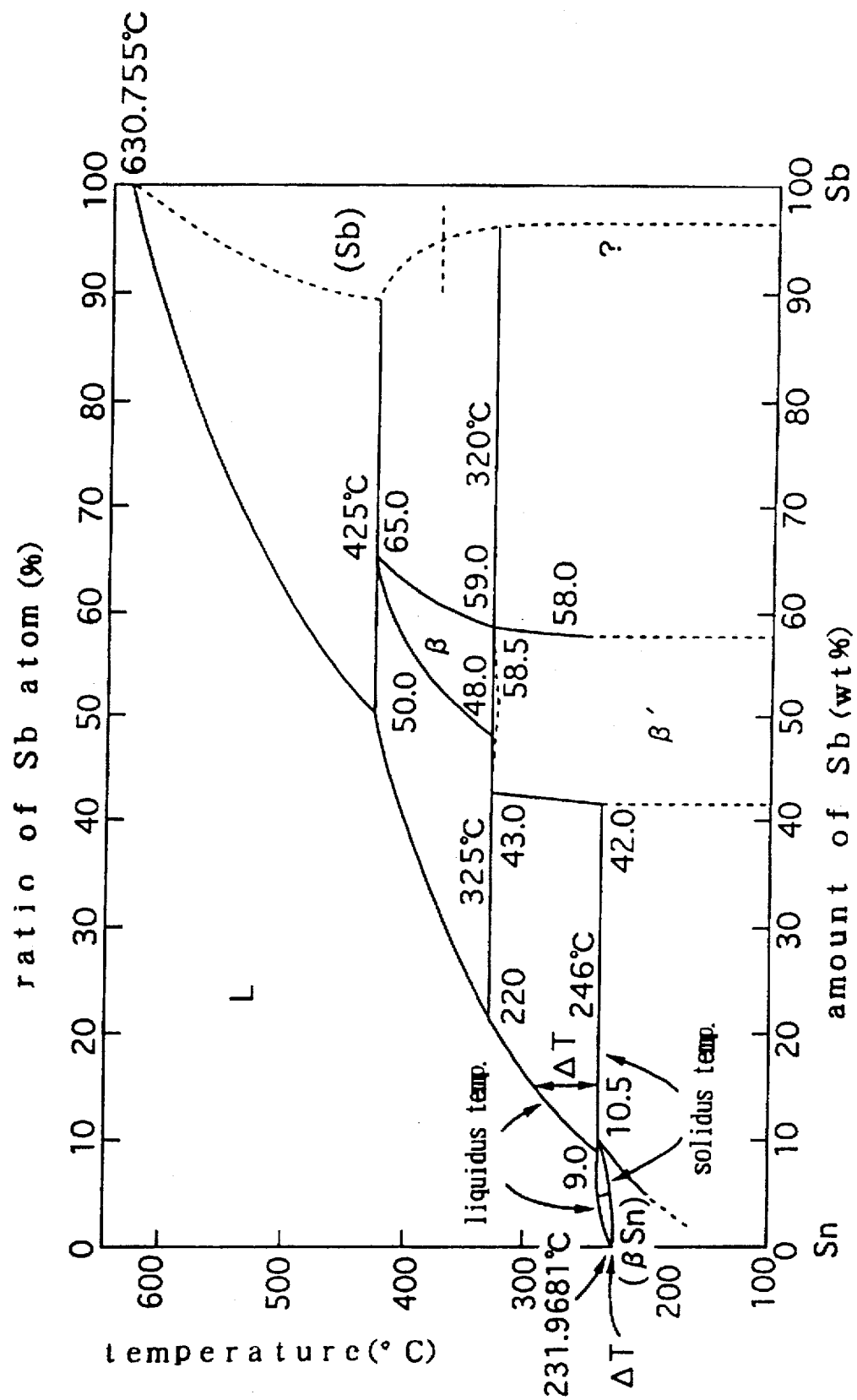
FIG. 9 is a phase diagram of a Sb—Sn alloy.

FIG. 8 shows the relationship between an additional amount of Sb and a melting range as for some solder alloys (sample Nos. 9, 18, 24 and 26 in the preferred embodiments). In FIG. 8, a horizontal axis represents the amount of Sb, and a vertical axis represents the melting range. According to FIG. 8, when the amount of Sb is approximately 1%, the wettability shows the minimum. Furthermore, as the amount of Sb increases, the melting range widens. Even if the amount of Sb is approximately 5%, the melting range is 17° C., which is relatively narrow. However, as seen from FIG. 9 which is a phase diagram of a Sb—Sn alloy, when the amount of Sb is more than 10%, the melting range remarkably widens.

Figure 10:
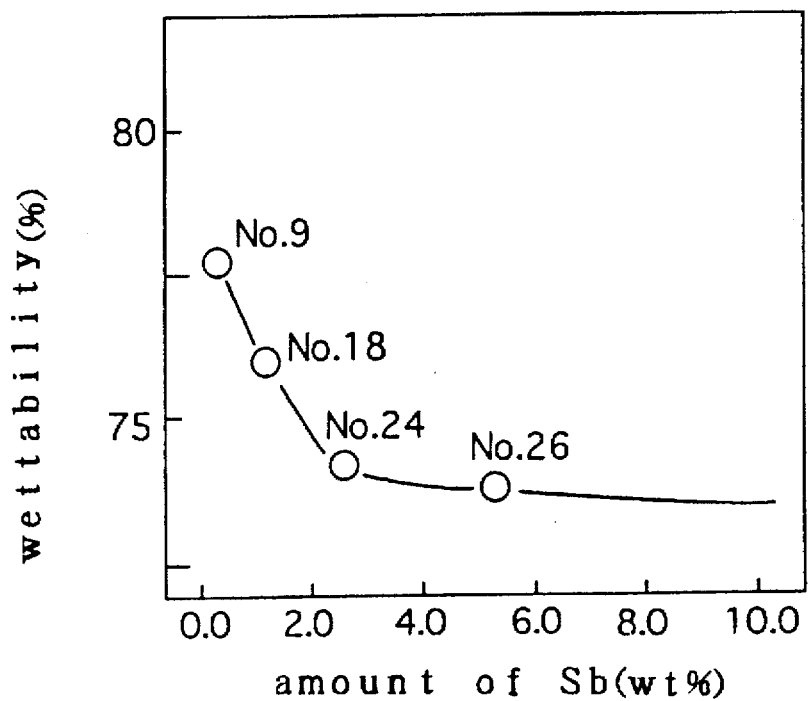
FIG. 10 is a diagram for showing the relationship between the amount of Sb and the wettability as for the same solder alloys as those in FIG. 8.

FIG. 10 shows the relationship between an amount of Sb and the wettability as for the same solder alloys as those in FIG. 8. In FIG. 10, a horizontal axis represents the amount of Sb, and a vertical axis represents the wettability. According to FIG. 10, when the amount of Sb is not less than 3%, the wettability shows no change.

As seen from FIGS. 8 and 10, in order to obtain narrow melting range and excellent wettability, the amount of Sb is in the range of 0.1 to 10%, more preferably, in the range of 0.5 to 6%.

The following are solder alloys having remarkably narrow melting range. A solder alloy comprising Sn, 3.3% of Ag, 1.6% of In and 3.1% of Bi shows a melting temperature of 1° C. (sample No. 7). A solder alloy comprising Sn, 0.5% of Ag, 6.1% of In and 3.1% of Bi shows a melting temperature of 0° C. (sample No. 27). A solder alloy comprising Sn, 3.2% of Ag, 5.9% of In, 3.1% of Bi and 0.9% of Sb also shows a melting temperature of 0° C. (sample No. 18).

Figure 11:
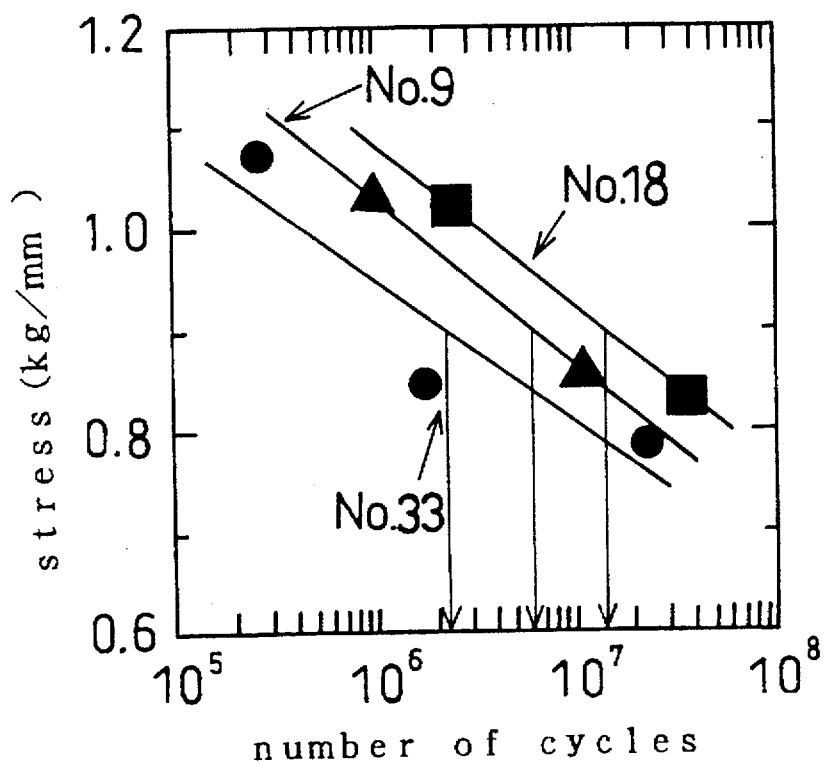
FIG. 11 is a diagram for showing the relationship between the stress and the number of cycles (until rupture) in a fatigue test as for some solder alloys: sample Nos. 9 and 18 in the preferred embodiments, and sample No. 33 in the comparative examples.

FIG. 11 shows the result of a fatigue test as for some solder alloys (sample Nos. 9 and 18 in the preferred embodiments and sample No. 33 in the comparative examples). In FIG. 11, a horizontal axis represents a number of cycles until a rupture occurs, and a vertical axis represents a stress.

Figure 12:
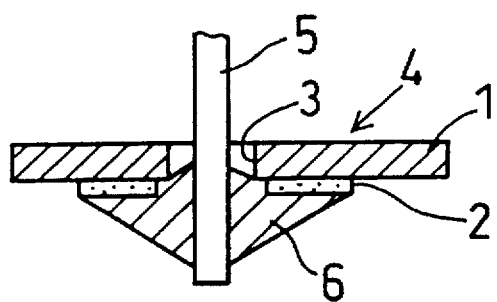
FIG. 12 is a drawing for typically showing a cross section of a test specimen used in the fatigue test.

The fatigue test is performed by using a test specimen as shown in FIG. 12. The test specimen is prepared as follows. A material 4 to be soldered comprises a glass epoxy resin copper laminate board 1 having a thickness of 1.6 mm, a circular Cu electrode 2 having a diameter of 3.5 mm and a through hole 3 having a diameter of 1.5 mm. The circular Cu electrode 2 is formed on one surface of the glass epoxy substrate 1, and the through hole 3 is formed at the center of the glass epoxy resin copper laminate board 1. A Cu lead 5 is passed through the through hole 3. The lead 5 and the circular Cu electrode 2 are soldered by a solder alloy 6.

A fatigue test is performed on the test specimen in such a manner that a load of 5.5 to 6.5 kg is applied in the direction (as shown in FIG. 12) at 20 cycles per second. Then, a number of cycles is calculated until a rupture occurs. In FIG. 12, a stress ($\tau$=F/S) is calculated by a load (F) and an area of soldering (S).

As compared with a solder alloy comprising Sn and 3.5% of Ag (sample No. 33), a solder alloy comprising Sn, 3.2% of Ag, 6.0% of In and 3.1% of Bi (sample No. 9) has approximately 3 times long duration of life. As compared with the solder alloy comprising Sn and 3.5% of Ag (sample No. 33), a solder alloy comprising Sn, 3.2% of Ag, 5.9% of In, 3.1% of Bi and 0.9% of Sb (sample No. 18) has approximately 8 times long duration of life. Therefore, an addition of In and Bi remarkably serves to lengthen the duration of life, and a further addition of Sb more remarkably serves to lengthen the duration of life.

As above described, each lead-free solder alloy according to the present invention shows lower melting point, narrower melting range, excellent wettability and longer duration of life, as compared with conventional solder alloys. Furthermore, the solder alloy has inexpensive cost, and it can be used for soldering of electronic parts.

What is claimed is:

1. A lead-free solder alloy consisting essentially of Ag in an amount of 0.8% inclusive to 5.0% inclusive by weight;

In in an amount of 0.1% inclusive to 9.5% inclusive by weight;

Bi in an amount of 0.1% inclusive to 9.5% inclusive by weight, the total amount of said In and said Bi being not more than 17% by weight;

Sb in an amount of 0.1% inclusive to 10% inclusive by weight; and the balance of Sn and inevitable impurities, and wherein the wettability is a minimum of 74%.

2. A lead-free solder alloy according to claim 1, wherein said Ag is included by 0.8% inclusive to 3.5% inclusive by weight, and said In and said Bi are included by 1.0% inclusive to 9.5% inclusive by weight individually.

3. A lead-free solder alloy according to claim 1, wherein said Sb is included by 0.5% inclusive to 6% inclusive by weight.

* * * * *